United States Patent [19]

Anderson et al.

[11] Patent Number: 4,828,440
[45] Date of Patent: May 9, 1989

[54] SNAP-IN NUT FOR FRAME ATTACHMENT TO BODY

[75] Inventors: Robert L. Anderson, Clarkston; John E. Parks, Rochester, both of Mich.

[73] Assignee: General Motors Corporation, Detroit, Mich.

[21] Appl. No.: 222,698

[22] Filed: Jul. 22, 1988

[51] Int. Cl.$^4$ .................. F16B 27/00; F16B 39/02
[52] U.S. Cl. .................. 411/85; 411/104; 411/182; 411/970
[58] Field of Search .................. 411/84, 85, 173, 174, 411/175, 177, 182, 427, 970, 104; 403/406.1, 407.1

[56] References Cited

U.S. PATENT DOCUMENTS

| | | | |
|---|---|---|---|
| 2,363,210 | 11/1944 | Tinnerman | 411/175 |
| 2,382,942 | 8/1945 | Murphy | 411/174 |
| 3,118,480 | 1/1964 | Kreider | 411/173 |
| 3,126,039 | 3/1964 | Fiddler | 411/112 |

*Primary Examiner*—Neill R. Wilson
*Attorney, Agent, or Firm*—Charles E. Leahy

[57] ABSTRACT

A nut is comprised of a one piece stamping having a base wall with an integrally formed conical nut. A frame member has a bolt receiving first aperture in a first planar wall and a nut receiving second aperture in a second planar wall extending at a generally perpendicular angle with respect to the first planar wall. The stamping has integral stop tabs which engage with the frame member to limit the insertion of the stamping into the second aperture so that the conical nut is registered with the bolt receiving first aperture. First and second integral flexure arms flex inwardly upon insertion of the stamping through the second aperture and then engage with the inner surface of the frame member to retain the stamping against removal from the frame member. Integral flanges engage with the walls of the frame member defining the second aperture to cooperate with the stop tabs and the flexure arms to maintain the base wall in position registering the conical nut with the bolt receiving first aperture and to restrain the stamping against rotation relative to the frame member upon the threaded installation of a bolt into the conical nut.

3 Claims, 2 Drawing Sheets

SNAP-IN NUT FOR FRAME ATTACHMENT TO BODY

The invention relates to a nut for receiving a bolt and more particularly a nut which is inserted through an aperture in a hollow frame member and has integral retention means for retaining the nut until a bolt is installed through a hole in the frame member to attach some additional member to the frame member.

BACKGROUND OF THE INVENTION

It is common in motor vehicles to construct a vehicle frame or vehicle body by forming or assembling various panels into a hollow tubular structure, or a channel structure. It is necessary to bolt such a hollow frame member to additional structure of the vehicle. It is desirable in some manner to mount a nut inside the hollow tubular member, overlying a hole through the tubular member, so that a bolt may subsequently be threaded into the nut to make the attachment to the hollow frame member. It is well known in such applications to simply weld the nut inside the tubular member, preferably before the tubular member is assembled. Furthermore it is well known to mount the nut within a cage so that the nut is captured in a loose fitting manner by which the nut may be moved somewhat in relation to the hole through the tubular member to properly align with the attaching bolt.

Frequently, such hollow frame members are constructed by welding together the edges of a pair of U-shaped channels. Accordingly, the weld nut or the cage nut may be welded to one of the channels before the channels are welded together to form the hollow frame member. After the channel members are welded together, the hollow frame member is painted and the application of paint fouls the threads of the nut.

It would be desirable to provide a nut which could be installed inside a hollow frame member subsequent to the assembly of the hollow frame member and the painting of the frame member.

SUMMARY OF THE INVENTION

According to the invention, a nut is comprised of a one piece stamping having a base wall with an integrally formed conical nut. The frame member has a bolt receiving first aperture in a first planar wall of the frame member and a second aperture in a second planar wall extending at a generally perpendicular angle with respect to the first planar wall. The one piece stamping is installed through the second aperture. The stamping has integral stop tabs which engage with the frame member to limit the insertion of the stamping so that the conical nut is registered with the bolt receiving first aperture. The stamping also has integral first and second flexure arms which flex inwardly upon insertion of the stamping through the second aperture and then engage with the inner surface of the frame member to retain the stamping against removal from the frame member. The stamping also has flanges integral therewith engaging with the walls of the frame member defining the second aperture to cooperate with the stop tabs and the second flexure arms to maintain the base wall in position registering the conical nut with the bolt receiving first aperture and to restrain the stamping against rotation relative to the frame member upon the threaded installation of a bolt into the conical nut. The second aperture preferably extends beyond the second planar wall and into the first planar wall. At least one integral stop tab engages with the second planar wall and a second stop tab which extends beyond the second planar wall and into the portion of the second aperture extending into the first planar wall so that the stop tabs function to assure that the stamping is inserted into the second aperture in a properly oriented attitude with the base wall in overlying engagement with the first planar wall.

Accordingly, the object, feature and advantage of the invention resides in a nut adapted for snap-in self retention in a frame member having a bolt receiving aperture in a first planar wall and a nut receiving aperture in a second planar wall which extends generally perpendicular with respect to a first planar wall.

Another, feature, object and advantage of the invention resides in the provision of a one-piece stamping having an integrally formed conical nut and integrally formed stop tabs, flexure arms, and flanges to permit insertion of the stamping into an aperture in a frame member and retain the stamping at a precisely located position therein registering the conical nut with a bolt receiving aperture provided in the frame member.

Another feature, object and advantage of the invention resides in the provision of a snap-in self retaining nut for insertion in a frame member and having associated stop tabs, flexure arms, and flanges which position the stamping loosely in overlying engagement with the bolt receiving aperture so that the nut assembly may be floated somewhat to permit desired alignment of the nut to the bolt being received therein.

BRIEF DESCRIPTION OF THE DRAWINGS

Further objects, features and advantages of the invention will become apparent upon consideration of the description of the preferred embodiment and the appended drawings in which.

DESCRIPTION OF THE PREFERRED EMBODIMENT

Figure 1:
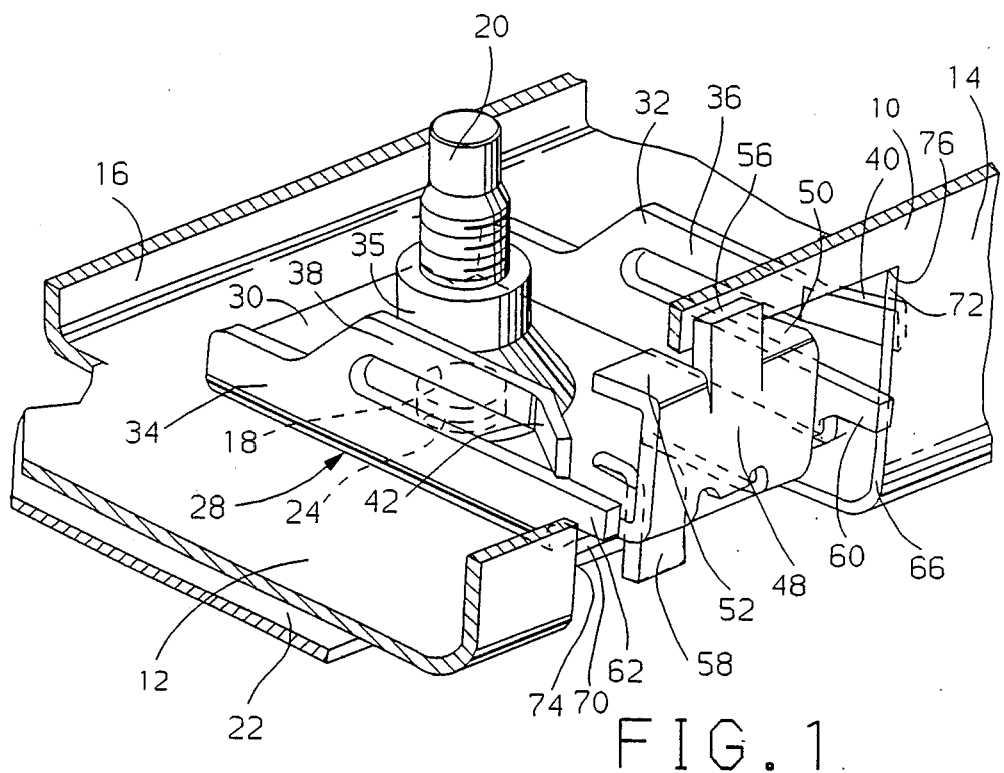
FIG. 1 is a perspective view having parts cut away and in section and showing the nut received in a hollow frame member and having a bolt threadedly installed therein.

Referring to FIG. 1, a vehicle body frame member 10 is comprised of sheet metal which is stamped or otherwise formed to a U-shaped configuration including a base wall 12 and a laterally spaced apart side walls 14 and 16. The base wall 12 has a bolt receiving aperture 18 for receiving a bolt 20 in order to attach a structure 22 to the frame member 10. The structure 22 has a bolt hole 24 which aligns with the bolt hole 18 of frame member 10.

A nut unit, generally indicated at 28, is installed into the frame member 10 to receive the bolt 20. The nut unit 28 is a sheet metal stamping and includes a base wall 30 and upstanding side walls 32 and 34. The base wall 30 has an integrally formed conical nut 35 having threads 37 on the interior thereof.

Flexure arms 36 and 38 are provided respectively on the side walls 32 and 34. The end of flexure arm 36 is bent outwardly to form a locking tang 40. The flexure arm 38 has a similar locking tab 42.

The base wall 12 is bent upwardly at the end of the base wall 12 to provide an end wall 48 having reversely bent locating flanges 50 and 52. A portion of the end wall 48 extends upwardly to define a stop tab 56. The base wall 12 is bent downwardly to provide a stop tab 58. The side flanges 32 and 34 are truncated at the end wall 48 to provide flanged fingers 60 and 62.

As best seen in FIG. 1, the side wall 14 of the frame member 10 has a nut receiving aperture 66. The aperture 66 is stamped or otherwise provided and is provided primarily in the side wall 14 but also extends into the base wall 12 where the end of the aperture 66 is defined by end wall 70. The sides of the aperture 66 are defined by edge portions 72 and 74 of the side wall 14 and by top edge 76.

The nut unit 28 is installed into the frame member 10 through the aperture 66. The width of the aperture 66, defined by the edge portions 72 and 74, is slightly wider than the width of the nut unit 28 as defined by the flanges 32 and 34. The lock tabs 40 and 42 extend to a width greater than the width of the aperture 66 so that the flexure arms 36 and 38 must flex inwardly to permit the complete entry of the nut unit 28 through the aperture 66. The insertion of the nut unit 28 into the aperture 72 is limited by the engagement of the stop tab 56 with the surface of side wall 14, and the engagement of the lower stop tab 58 with the end wall 70 of aperture 66.

As best seen in FIG. 1, the insertion of the nut unit 28 to the full extent as defined by the engagement of the stop tabs 58 and 56 with the frame member 10, permits the lock tabs 40 and 42 to spring back out into their normal width which is greater than the width of the aperture 66 as defined by the side walls 72 and 74. Accordingly, the lock tabs 40 and 42 will function to prevent the removal of the nut unit 28 from the aperture 66.

As best seen in FIG. 1, the insertion of the nut unit 28 to the extent defined by the stop tabs 58 and 56 positions the nut unit 28 with the conical nut 35 in registered alignment with the bolt receiving aperture 18 of frame member 10.

The lateral positioning of the nut unit 28 within the aperture 66 is determined by the engagement of the flange arms 60 and 62 with the side walls 72 and 74. The vertical positioning of the nut unit 28 within the aperture is determined by the engagement of the base wall 30 with the base wall 12 of the frame member 10 and by the engagement of the reversely bent flanges 50 and 52 with the top wall 76 of aperture 66.

It will be appreciated that it is desirable to have the nut unit 28 float somewhat within the frame 10 in order to facilitate the entry of the bolt 20 into the conical nut 35. Accordingly, the aperture 66 may be somewhat wider than the width of the nut unit 28 and somewhat taller than the height of the reversely bent flanges 50 and 52 from the base wall 12. In addition, the lock tabs 40 and 42 are somewhat shorter than that which would result in a tight engagement with the frame member 10 so that the nut unit 28 is permitted to move somewhat within the confines of the aperture 66.

It will be understood that the threading of the bolt 20 into the conical nut 35 will apply torque to the nut unit 28 which would tend to rotate the nut unit. However, the nut unit is retained by its close fitting relationship within the aperture 66. More particularly, the stop tab 58 engages end wall 70 of base 12 and flange arms 60 and 62 engage with side walls 66 and 74.

Figure 2:
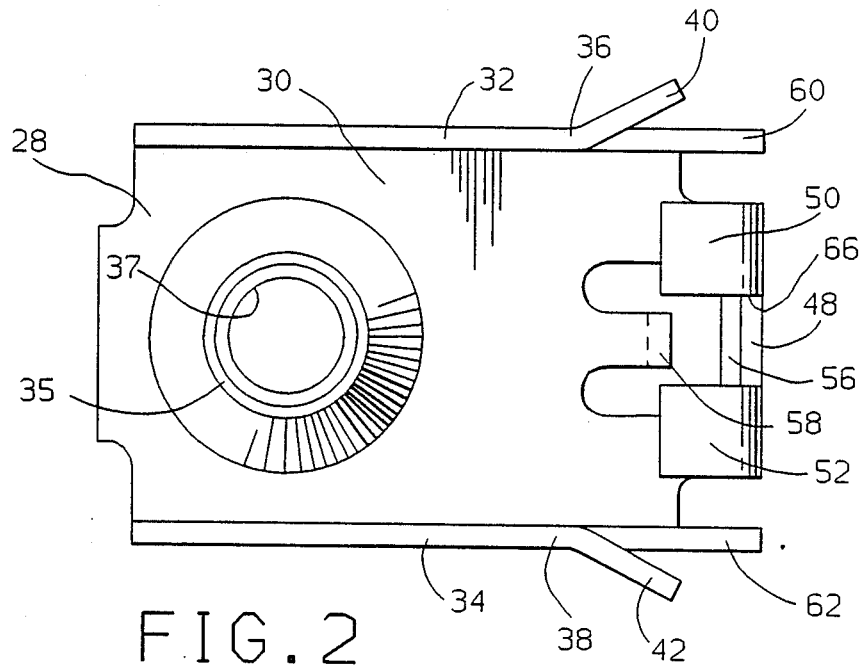
FIG. 2 is a plan view of the nut.
Figure 3:
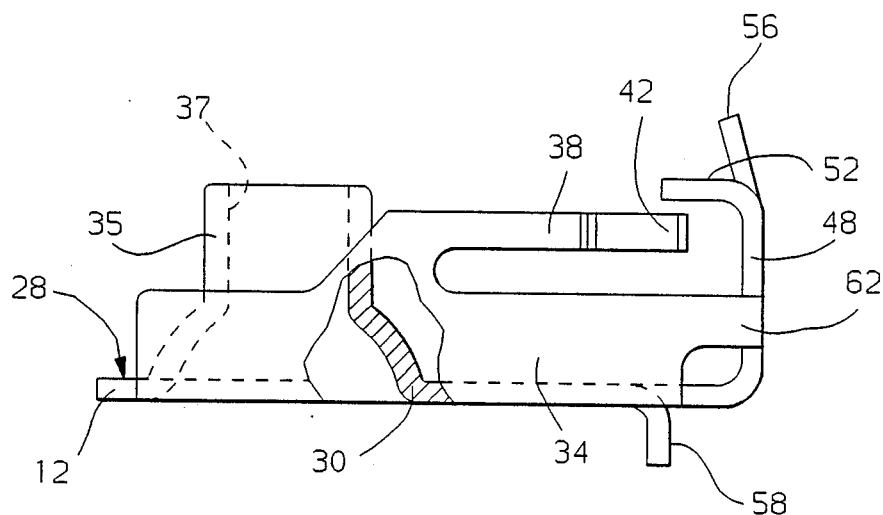
FIG. 3 is a side elevation view of the nut.
Figure 4:
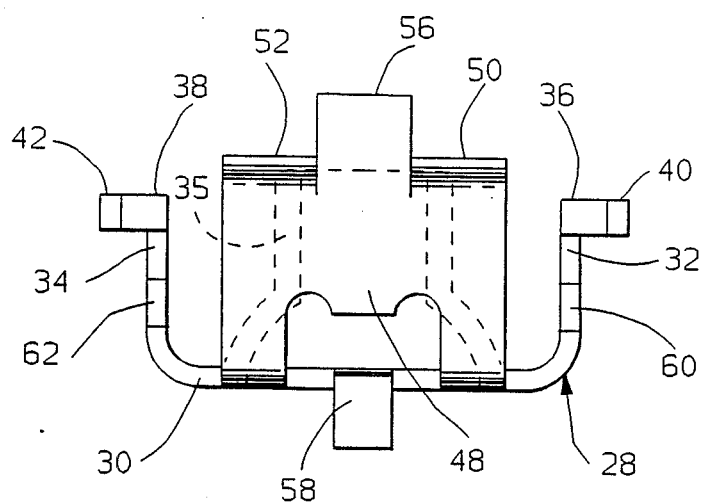
FIG. 4 is an end elevation view of the nut.

As best seen in FIGS. 1 and 2, the lower stop tab 58 is closer to the conical nut 35 than the upper stop tab 56. Accordingly, the nut unit 28 cannot be inserted upside down into the aperture 66 because the lower tab unit 52 would engage with the frame member side wall 14 before the locking tabs 40 and 42 would have passed through the aperture 66 to lock with the side wall 14. Accordingly, the assembly operator will necessarily remove the nut and turn the nut over to obtain its proper insertion as shown in FIG. 1 with the base wall 30 of the nut unit 28 overlying the base wall 12 of the frame member 10.

Thus it is seen that the invention provides a new and improved nut unit which may be inserted into an auxiliary access opening and a frame member to align an integral conical nut with a bolt receiving hole provided in the base wall of the frame member. The embodiment shown in the drawings has the side wall 14 of the frame member 10 extending generally perpendicular with respect to the base wall 12. However, it will be understood that the side wall 14 may be angled somewhat with respect to the base wall 12, in which case the nut unit 28 preferably has the end wall 48 somewhat bent to cooperate with the side wall 14 in locating the conical nut 35 in overlying relationship with the bolt receiving hole 18.

The nut 28 is preferably installed into the frame member 10 after the frame member 10 has been painted so that the threads 37 of the conical member 35 do not become fouled with paint.

The embodiments of the invention in which an exclusive property or privilege is claimed are defined as follows:

1. A nut adapted for snap-in self retention in a frame member having a bolt receiving first aperture in a first planar wall of the frame member and a nut receiving second aperture in a second planar wall extending at an angle with respect to the first planar wall;
   a one-piece stamping having a base wall with an integrally formed nut, stop means integral with the stamping engaging the frame member to limit the insertion of the stamping into the second aperture of the frame member so that the nut is positioned in overlying relationship with the bolt receiving first aperture, first and second flexure arms integral with the stamping engaging the frame member on opposite sides of the second aperture to retain the stamping against removal from the frame member independent of the installation of a bolt into the bolt receiving first aperture, and means integral with the stamping adapted to engage with the frame member to restrain the stamping against rotation relative to the frame member upon the threaded installation of a bolt into the bolt receiving first aperture.

2. A nut adapted for snap-in self retention in a frame member having a bolt receiving first aperture in a first planar wall of the frame member and a nut receiving second aperture in a second planar wall extending at an angle with respect to the first planar wall;
   a one-piece stamping having a base wall with an integrally formed nut, stop means integral with the stamping engaging the frame member to limit the insertion of the stamping into the second aperture of the frame member so that the nut is registered with the bolt receiving first aperture, first and second flexure arms integral with the stamping engaging the frame member at opposite sides of the second aperture to retain the stamping against removal from the frame member independent of the installation of a bolt into the bolt receiving first aperture, and flange means integral with the stamping engaging with the walls of the frame member defining the second aperture to cooperate with the stop means and the first and second flexure arms to maintain the base wall in position registering the conical nut in bolt receiving alignment with the bolt receiving aperture of the frame member and to restrain the stamping against rotation relative to the frame member upon the threaded installation of a bolt into the bolt receiving first aperture.

3. A nut and bolt retention system for making an attachment to a closed hollow frame member, comprising;

said hollow member having a bolt receiving first aperture in a first planar wall of the frame member and a nut receiving second aperture in a second planar wall extending at a generally perpendicular angle with respect to the first planar wall, said second aperture also extending beyond the second planar wall and into the first planar wall, and a one-piece stamping having a base wall with an integrally formed nut, stop means integral with the stamping engaging the frame member to limit the insertion of the stamping into the second aperture of the frame member so that the nut is registered with the bolt receiving first aperture, said stop means including a first stop means engaging the second planar wall and a second stop means extending beyond the plane of the second planar wall and into the portion of the second aperture provided in the first planar wall so the stop means function to assure that the stamping is inserted into the second aperture in a properly oriented attitude with the base wall in overlying engagement with the first planar wall, means integral with the stamping engaging the frame member to retain the stamping against removal from the frame member, and means integral with the stamping adapted to engage with the frame member to restrain the stamping against rotation relative to the frame member upon the threaded installation of a bolt into the bolt receiving first aperture.

\* \* \* \* \*